United States Patent Office 3,002,810
Patented Oct. 3, 1961

3,002,810
METHOD FOR PRODUCING SODIUM BORATES OF LOWERED IRON CONTENT
George W. Campbell, Jr., Santa Ana, Calif., assignor to United States Borax & Chemical Corporation, Los Angeles, Calif., a corporation of Nevada
No Drawing. Filed May 13, 1960, Ser. No. 28,820
4 Claims. (Cl. 23—59)

The present invention relates to a method for reducing the iron content of sodium borate solutions.

Most commercial sodium borates, as for example, sodium tetraborate decahydrate and sodium tetraborate pentahydrate are produced from ores containing the crude borates combined with a gangue comprising clay and small amounts of various other impurities.

The common method for the recovery of the sodium borates is a "wet process" in which the ore is treated with water or a mother liquor containing sodium borate and some carbonate ion in a dissolving tank. The sodium borate is dissolved in the water or mother liquor, treated with carbonate ion and separated from the gangue by subsequent screening, settling and filtration. The finished sodium borate products are then usually obtained from the clarified solution by crystallization. The clarified sodium borate solutions contain on the order of about 25-75 parts per million total iron and the finished products when crystallized from these solutions contain on the order of from about 15-50 parts per million total iron. For most of the commercial uses of the sodium borates this small quantity of iron is of no importance; however, there are various requirements for sodium borates wherein it is necessary that the iron content be on the order of 8 parts per million and less.

It is, therefore, the principal object of the present invention to provide a "wet process" method for producing sodium borates having a lowered iron content.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing sodium borates having a lowered iron content which comprises adding to an aqueous solution of sodium borate containing carbonate ions in said solution and additionally containing iron as a contaminant, at least 0.005% of a water-soluble zinc salt, allowing said zinc salt to form zinc carbonate with said carbonate ions and to settle out whereby the iron in said solution is carried down with said zinc carbonate, separating the sodium borate solution from said zinc carbonate and iron and crystallizing sodium borate from said purified solution.

The present invention is directly applicable to present "wet process" methods for the production of sodium borates which use carbonate ions to precipitate out contaminants which will form insoluble carbonates. An excess of carbonate ion is usually added to the dissolving section of the process to insure as complete and as rapid a precipitation as is possible and so that the insoluble carbonates formed can be removed with the gangue. It is the excess carbonate ion which remains in solution which makes possible the formation of zinc carbonate when soluble zinc salts are added to the sodium borate solutions.

The following list is illustrative of zinc salts applicable to the present invention:

Zinc chloride
Zinc acetate
Zinc bromide
Zinc borate
Zinc chlorate
Zinc nitrate
Zinc sulfate The preceding list is not complete and should not be taken as limiting the present invention. It is to be clearly understood that any water-soluble zinc salt is applicable to the present process. It is of interest to note that zinc oxide, which has a low order of solubility, has been found to be sufficiently soluble in an aqueous medium to be usable in the present invention. In the preferred embodiment of the invention, we use zinc chloride as it is readily available and is the most economically desirable of the zinc salts.

It has been found that a minimum of about 0.005% zinc salt by weight of solution is required to initiate the lowering of the iron content of the sodium borate solutions. When long settling periods are available from about 0.005% to about 0.02% zinc salt addition will effect a substantial change in the iron content of these solutions. In order to effect a rapid lowering of the iron contamination, however, the most effective range of zinc salt addition has been found to be on the order of from about 0.05% to about 0.5% by weight of solution dependent on the original iron content of the sodium borate solutions. Larger quantities of zinc salts may be used. However, as this does not change the settling rate to any appreciable extent, for the sake of economy I use from about 0.005% to about 0.5% zinc salt by weight of sodium borate solution.

When the soluble zinc salts are added to the sodium borate solutions a flocculent precipitate is formed and as the precipitate settles the solutions lose their yellow color and become water white. My theory is that iron exists in the sodium borate solutions as iron carbonate in a supersaturated state, and when soluble zinc salts are added to the solutions, zinc carbonate forms precipitates and carries down the iron carbonate as a coprecipitate. The iron, according to my theory, is therefore not merely removed by physical entrapment in the zinc carbonate. Whether this theory is correct or not, however, does not affect the validity of the invention as it will be seen that the addition of soluble zinc salts to sodium borate solutions effectively lowers the iron content of these solutions.

The soluble zinc salts may be introduced into the sodium borate solutions in various ways. They may be added as solids to the pulverized ore prior to dissolution, they may be added as solids directly to the sodium borate solutions in settling tanks or they may be added as aqueous solutions to the dissolving or settling tanks. All of these methods are equally applicable to present "wet processes." In the preferred embodiment of the present invention, I add the zinc salts as aqueous solutions either to the dissolving section or settling section of the process.

So that the present invention is more clearly understood, the following examples are given for illustrative purposes:

I 100 pounds of sodium borate solution which contained 1.02% carbon dioxide and 44 parts per million iron was treated with 0.05 pound of zinc nitrate which had been dissolved in 20 ml. of water (hot).

Precipitation started immediately and after two hours the sodium borate solution contained 21.6 parts per million iron, after eight hours the iron concentration was 12.7 parts per million, and after 14 hours the iron concentration had dropped to 8.7 parts per million.

II

The process of Example I was repeated except that the soluble zinc salt added was zinc chloride. The results were comparable to those of Example I.

III 100 pounds of sodium borate solution which contained 0.98% carbon dioxide and 41.2 parts per million iron was treated with 0.5 pound of zinc chloride which had been dissolved in 120 ml. of water. Precipitation started immediately and after two hours the sodium borate solution contained 14.1 parts per million iron and the iron concentration after three hours had dropped to 7.8 parts per million.

IV 100 pounds of sodium borate solutions which contained 1.02% carbon dioxide and 31.8 parts per million iron was treated with 0.5 pound of zinc chloride which had been dissolved in 120 ml. of water. Precipitation started immediately and after two hours the sodium borate solution contained 9.1 parts per million iron and after three hours the iron concentration had dropped to 5.0 parts per million.

Other modes of applying the principle of the invention may be employed, change being made as regards the details described, provided the features stated in any of the following claims or the equivalent of such be employed.

I, therefore, particularly point out and distinctly claim as my invention:

1. The method of producing sodium borates having a lowered iron content which comprises adding to an aqueous solution of sodium borate containing carbonate ions in said solution and additionally containing iron as a contaminant, at least 0.005% of a water-soluble zinc salt allowing the zinc salt to form zinc carbonate with said carbonate ions and to settle out whereby the iron in said solution is carried down with said zinc carbonate, separating the sodium borate solution from said zinc carbonate and iron and crystallizing sodium borate from said solution.

2. The method of producing sodium borates having lowered iron content which comprises adding to an aqueous solution of sodium borate containing carbonate ions in said solution and additionally containing iron as a contaminant from about 0.005% to about 0.5% of a water-soluble zinc salt, allowing the zinc salt to form zinc carbonate with said carbonate ions and to settle out whereby the iron in said solution is carried down with said zinc carbonate, separating the sodium borate solution from said zinc carbonate and iron and crystallizing sodium borate from said solution.

3. The method of claim 2 where said zinc salt is zinc nitrate.

4. The method of claim 2 where said zinc salt is zinc chloride.

References Cited in the file of this patent

UNITED STATES PATENTS

| 714,503 | Meister | Nov. 25, 1902 |
| 994,502 | Claflin | June 6, 1911 |
| 1,468,366 | Kelly | Sept. 18, 1923 |
| 1,847,836 | Kelly | Mar. 1, 1932 |
| 2,961,294 | Taylor et al. | Nov. 22, 1960 |

FOREIGN PATENTS

| 2630 | Great Britain | 1856 |